United States Patent
DiGiovanni et al.

(10) Patent No.: US 7,043,128 B2
(45) Date of Patent: May 9, 2006

(54) MULTIMODE OPTICAL FIBERS WITH INCREASED BANDWIDTH

(75) Inventors: David John DiGiovanni, Montclair, NJ (US); Frank Vincent DiMarcello, Annandale, NJ (US); XinLi Jiang, Shrewsbury, MA (US); George E. Oulundsen, Belchertown, MA (US); Sandeep Prabhakar Pandit, Southbridge, MA (US)

(73) Assignee: Furukawa Electric North America, Norcross, GA (US)

( * ) Notice: Subject to any disclaimer, the term of this patent is extended or adjusted under 35 U.S.C. 154(b) by 0 days.

(21) Appl. No.: 10/786,738

(22) Filed: Feb. 25, 2004

(65) Prior Publication Data

US 2004/0228590 A1    Nov. 18, 2004

Related U.S. Application Data

(62) Division of application No. 10/027,067, filed on Dec. 20, 2001, now Pat. No. 6,735,985.

(51) Int. Cl.
*G02B 6/22* (2006.01)

(52) U.S. Cl. .................. 385/126; 385/104; 385/123

(58) Field of Classification Search ............ 385/123, 385/122, 124, 125, 126, 127, 128, 28, 37, 385/11, 27; 65/402, 435
See application file for complete search history.

(56) References Cited

U.S. PATENT DOCUMENTS

| | | | |
|---|---|---|---|
| 5,123,076 A * | 6/1992 | Nishimoto et al. ......... 385/124 |
| 5,298,047 A * | 3/1994 | Hart et al. .................... 65/435 |
| 5,581,647 A * | 12/1996 | Onishi et al. ................ 385/123 |
| 5,704,960 A * | 1/1998 | Evans et al. .................. 65/402 |
| 5,721,800 A * | 2/1998 | Kato et al. ................... 385/127 |
| 5,897,680 A * | 4/1999 | Geertman ..................... 65/402 |
| 6,076,376 A * | 6/2000 | Onishi et al. ................. 65/402 |
| 6,240,748 B1 * | 6/2001 | Henderson et al. ........... 65/402 |
| 6,347,537 B1 * | 2/2002 | Onishi et al. ................. 65/402 |
| 6,422,043 B1 * | 7/2002 | DiGiovanni et al. .......... 65/402 |
| 6,487,338 B1 * | 11/2002 | Asawa et al. ................. 385/29 |
| 6,550,283 B1 * | 4/2003 | Blaszyk et al. ............... 65/402 |
| 6,658,896 B1 * | 12/2003 | Galarza ....................... 65/408 |
| 6,859,596 B1 * | 2/2005 | Garner et al. ............... 385/123 |
| 6,883,351 B1 * | 4/2005 | Berkey et al. ................ 65/428 |
| 2003/0024278 A1 * | 2/2003 | Berkey et al. ................ 65/428 |
| 2004/0022507 A1 * | 2/2004 | Galtarossa et al. ......... 385/123 |

* cited by examiner

*Primary Examiner*—Frank G. Font
*Assistant Examiner*—James P. Hughes
(74) *Attorney, Agent, or Firm*—Peter V. D. Wilde

(57) ABSTRACT

The specification describes a technique for drawing circular core multimode optical fiber using twist during draw to increase fiber bandwidth.

4 Claims, 5 Drawing Sheets

MULTIMODE OPTICAL FIBERS WITH INCREASED BANDWIDTH

RELATED APPLICATION

This application is a division of application Ser. No. 10/027,067, filed Dec. 20, 2001, now U.S. Pat. No. 6,735,985, issued Mat 18, 2004.

FIELD OF THE INVENTION

This invention relates to multimode optical fibers having increased bandwidth.

BACKGROUND OF THE INVENTION

Manufacture of state of the art multimode optical fiber requires demanding control over a variety of power loss and signal impairment mechanisms. For multimode fiber, controlling mode dispersion is an important goal.

As is well known, within the optical fiber, bits of data are represented by pulses of light. Each pulse of light will spread, or disperse, over time as it travels the length of the fiber. If these data pulses overlap, they can no longer be unambiguously read at the receiving end. Lower tendency toward data pulse overlap results in higher data transmission capacity, i.e. higher bandwidth. Therefore, the bandwidth of optical fibers is ultimately limited by dispersion.

Predominant forms of dispersion are chromatic dispersion and mode dispersion. Chromatic dispersion is well known and occurs is all optical fiber systems. Mode dispersion, or intermodal dispersion, occurs mainly in multimode optical fibers where the large core diameter allows a wide number of optical paths for light to travel. Different optical paths usually have different lengths. Because the modes travel along paths of varying length, they arrive at the fiber end at different intervals of time. If the time difference is great enough, the pulse traveling the faster path will overlap the pulse ahead of it.

Multimode optical fiber bandwidth is optimized by minimizing intermodal dispersion. This is commonly achieved by using graded index profiles wherein the refractive index gradually increases from the outer region of the cladding to the center of the core. Signals travel faster in the low-index region near the cladding, and slower in the high-index region near the center of the core.

In multimode optical fiber, mode dispersion may be referred to as Differential Mode Delay (DMD). Manufacturing specifications for optical fiber for use in state of the art systems have rigid requirements for DMD. The DMD specification within a given optical fiber core radius is called mask width. For example, fibers with DMD of less than 0.23 ps/m within a core radius of 18 microns are referred to as having a mask width within the 18 micron radius of <0.23 ps/m. This may also be expressed as MW 18<0.23 ps/m. These mask width specifications correspond to an optical fiber having an Effective Modal Bandwidth (EMB) of 2000 MHz-km at 850-nm, and optical fibers meeting these mask width specifications typically have overfilled bandwidths >500 MHz-km at 1300-nm. 850-nm and 1300-nm are typical wavelengths of choice for multimode optical systems. Manufacturing multimode optical fiber to meet these specifications has proven difficult.

It is known that short range refractive index variations, or perturbations, cause mode mixing, which has the effect of averaging the transmission distance for all modes traversing the optical fiber. Techniques for enhancing mode mixing have been sought by workers in the art to address adverse DMD. One of these is described in U.S. patent application Ser. No. 847,034 filed May 1, 2001 by DiGiovanni et al., which is incorporated by reference herein in its entirety. In that approach the fiber core is made non-circular, and the optical fiber is twisted during draw. Significant increases in bandwidth result. However, there is always a quest for further improvements in multimode optical fiber bandwidth.

STATEMENT OF THE INVENTION

We have developed multimode optical fiber that satisfies current bandwidth needs and has promise for meeting future high-speed Ethernet protocols. It is known from prior work, e.g. the patent referenced above, that short range refractive index variations, or perturbations, in a multimode optical fiber can result in enhanced mode mixing. These perturbations exist as inherent "defects" even in high quality optical fiber. We have recognized the ubiquitous nature of these perturbations, as well as the fact that to be optimally effective they should be randomized along the path lengths of the various modes traversing the fiber. Following this recognition we have demonstrated that DMD in multimode optical fibers with cores regarded as essentially circular can be reduced by adding twist to the optical fiber as it is drawn.

The invention will be described in greater detail with the aid of the drawing.

DETAILED DESCRIPTION

Figure 1:
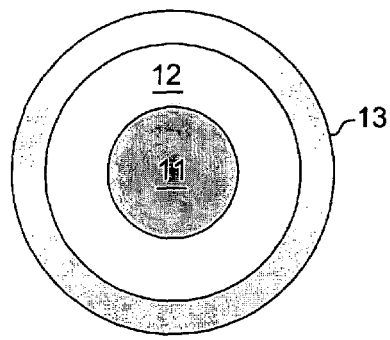
FIG. 1 is a schematic representation of a multimode optical fiber that may be manufactured in accordance with the invention.

Referring to FIG. 1, a typical multimode optical fiber structure is shown with core 11 and cladding 12. A standard polymer protective coating, typically an acrylate polymer, is shown at 13.

The multimode characteristic of the optical fiber is represented by the relative size of core 11, and the shaded representation of the index variation from the center to the outside of the core. There are three common types of multimode fiber. These may be defined by the core/cladding diameter, expressed in microns:

50/125—FDDI standard; used for data communications;
62.5/125—FDDI standard for local data communications (and the most prevalent multi-mode fiber in use in North America);

100/140—designed for specialized applications where light coupling efficiency and bending sensitivity are important.

As a general proposition, multimode fiber has a core/clad diameter ratio greater than 0.2, and typically greater than 0.4. This can be compared to single mode fiber with a core/clad diameter ratio typically less than 0.1. The core itself in a multimode fiber is typically greater than 30 microns, while the core of a single mode fiber is typically less than 10 microns.

Figure 2:
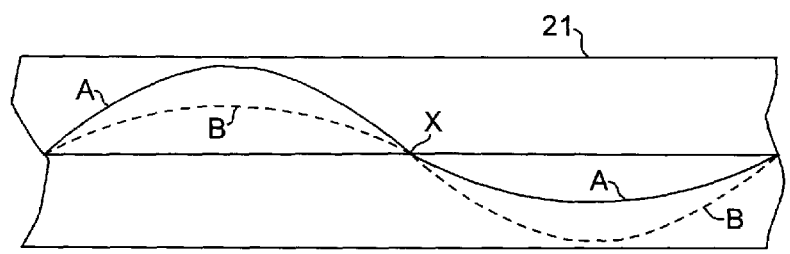
FIG. 2 is a diagram of idealized mode transmission along a length of optical fiber.

The mechanism of mode mixing for reducing DMD is illustrated in FIG. 2. It should be understood that this is a highly idealized representation and is presented only for a phenomenological understanding of this aspect of the invention. The core of the optical fiber in this illustration is represented by 21. Two modes are represented, mode A, shown as a solid line, and mode B, shown as a dashed line. The propagation direction is toward the right of the page. Mode A starts to propagate near the outside of the core as shown to the left of the figure, and mode B starts propagation near the core center. It is easily understood that if these relative mode propagation patterns continue down the length of the fiber, mode A would travel a distance substantial greater than mode B. At the center of the diagram is a region, denoted by reference numeral X, where mode mixing occurs. In reality, mode mixing occurs over the entire length of fiber and is due to coupling of energy from one mode to another. That coupling is enhanced by the perturbations mentioned above. With the schematic representation of mode mixing at X in the figure, mode A thereafter is coupled to a mode nearer the center of the core, and mode B couples to a mode near the outside of the core. While this diagram is highly idealized, it does serve to illustrate how, if modes constantly couple or mix along the length of the fiber, the average distance traveled by all modes over an extended length L will be equal. In a real environment, mode mixing occurs both within a mode group, as well as between mode groups. For a discussion of mode coupling in multimode optical fibers see R. Olshansky, *Reviews of Modern Physics*, Vol. 51 (2), pp. 341–367 (1979), which paper is incorporated herein by reference.

Optical fiber preforms useful for drawing optical fiber according to this invention may be made by a variety of known techniques including MCVD, PCVD, OVD and VAD. The preferred technique is MCVD. In MCVD, a precisely controlled mixture of chemicals flows through the inside of a rotating pure silica glass tube. The silica tube is heated externally by a torch. The gases flowing through the tube react to form high purity silica particles in the vicinity of the deposition torch. As the particles are formed, they deposit downstream on the inner wall of the tube. The particles are heated to a high temperature to consolidate them into pure transparent silica. The tube is then collapsed and is ready for optical fiber draw.

Broadly speaking, the invention is embodied in a novel and convenient method of making multimode optical fiber having improved DMD, and the resulting product, i.e. the improved optical fiber itself. More specifically, the inventive method comprises providing a conventional optical fiber preform, heating at least a portion of the preform to a conventional draw temperature, and drawing optical fiber from the heated preform in such a way that a spin is impressed on the fiber. The spin in the fiber is produced by applying a torque to the fiber while it is being drawn, i.e. in the softened glass state, such that the fiber is caused to twist around its longitudinal axis, with a resulting torsional deformation of the glass. When the softened glass cools, the deformation is frozen in the fiber, such that the fiber exhibits a permanent "spin", i.e., a permanent torsional deformation. The existence of such a frozen-in spin can be readily ascertained, e.g., by means of a traveling magneto-optic modulator, as used by M. J. Marrone et at., Optics Letters, Vol. 12(1), p. 60.

Associated with the frozen-in spin is a pitch, the spin repeat distance along the fiber. The pitch can be expressed in terms of twists per meter, and, for the purpose of this invention, is at least 4 twists per meter.

In the preferred embodiment of the invention, the twist is alternated between a left hand twist and a right hand twist, i.e. the fiber relative to the longitudinal axis is rotated clockwise, then counterclockwise. Rotations are complete 360 degree rotations so a prescription for, e.g., 4 twists per meter, would involve 2.5 rotations in each direction. This produces a fiber with a chiral structure, chiral being defined as a right hand twist followed by a left hand twist. The period of twist reversal can be expressed as twists per meter, as mentioned above, or in terms of the length of fiber between twists. For example, a fiber with 5 twists per meter would have a twist (or chiral) period of 20 cm. In practice, the twist can be imparted by rotating the preform during draw, or by rotating the drawn (solidified) fiber during draw. Typically, the number of twists in the clockwise direction will be the same as the number in the counterclockwise direction. However, different numbers in each direction may also be used to advantage. Although it is preferred to alternate twists between clockwise and counterclockwise directions, similar advantages may be realized using continuous twist, i.e. twist either in the clockwise or the counterclockwise direction.

The effect of twisting the fiber back and forth is to further randomize the perturbations experienced by a given mode traveling along the core so that, ideally, every mode in every mode group experiences a maximum amount of mode coupling. It may be preferred to use a random twist period, i.e. to change the twist frequency as the fiber is being drawn. This is consistent with known theory that predicts more effective mode mixing with random perturbations. See, for instance, S. C. Rashleigh, J. of Lightwave Technology, Vol. LT-1(2), pp. 312–331, especially p. 320, where it is stated that, " . . . regardless of the actual distribution f(z) of the birefringence perturbations, only the one spectral component with frequency $b_i$ can couple the two polarization eigenmodes. All other spectral components do not efficiently couple the modes".

The parameter $b_i$ is the intrinsic birefringence of the fiber, and $F(b_i)$ is the Fourier transform of f(z). Since the perturbation f(z) is essentially random, it is theorized that a constant pitch spin will not result in efficient mode coupling. On the other hand, non-constant pitch spin, especially spin that has alternately positive and negative helicity, is likely to contain spatial components that produce efficient coupling. Strong coupling can be obtained with spin of varying spatial frequency that comprises, in addition to regions of relatively high spin spatial frequency, regions of relatively low spin spatial frequency. This is, for instance, the case if the spin alternates between positive and negative helicity.

Figure 3:
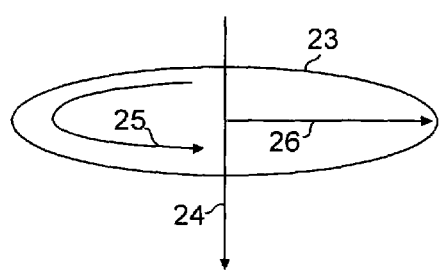
FIG. 3 is a diagram showing three types of potential spatial non-uniformities in the glass material of the optical fiber.

Spatial perturbations that can be randomized to advantage according to the invention are illustrated by the diagram of FIG. 3 where the circle 23 represents the cross section of the optical fiber. Longitudinal perturbations are represented by arrow 24, azimuthal perturbations are represented by arrow 25, and radial perturbations are represented by arrow 26. U.S. patent application Ser. No. 847,034 uses elliptical core structures to increase mode mixing. The twist imparted to the fiber makes the optical path length equal for any random walk along the fiber core. However, we have recognized that in fibers with circular cores, twist can improve DMD by randomizing other perturbations, for example, azimuthal variations. For the purpose of this invention, circular cores are intended to cover core geometries with ovality less than 6%.

The invention is also embodied in silica based optical fiber per se, comprising a circular core and a cladding, with the core having larger effective refractive index than the cladding material that surrounds the core, and further wherein the core contains a chiral structure according to the invention. The chiral structure is produced by modifying the optical fiber draw apparatus in a manner described below.

Figure 4:
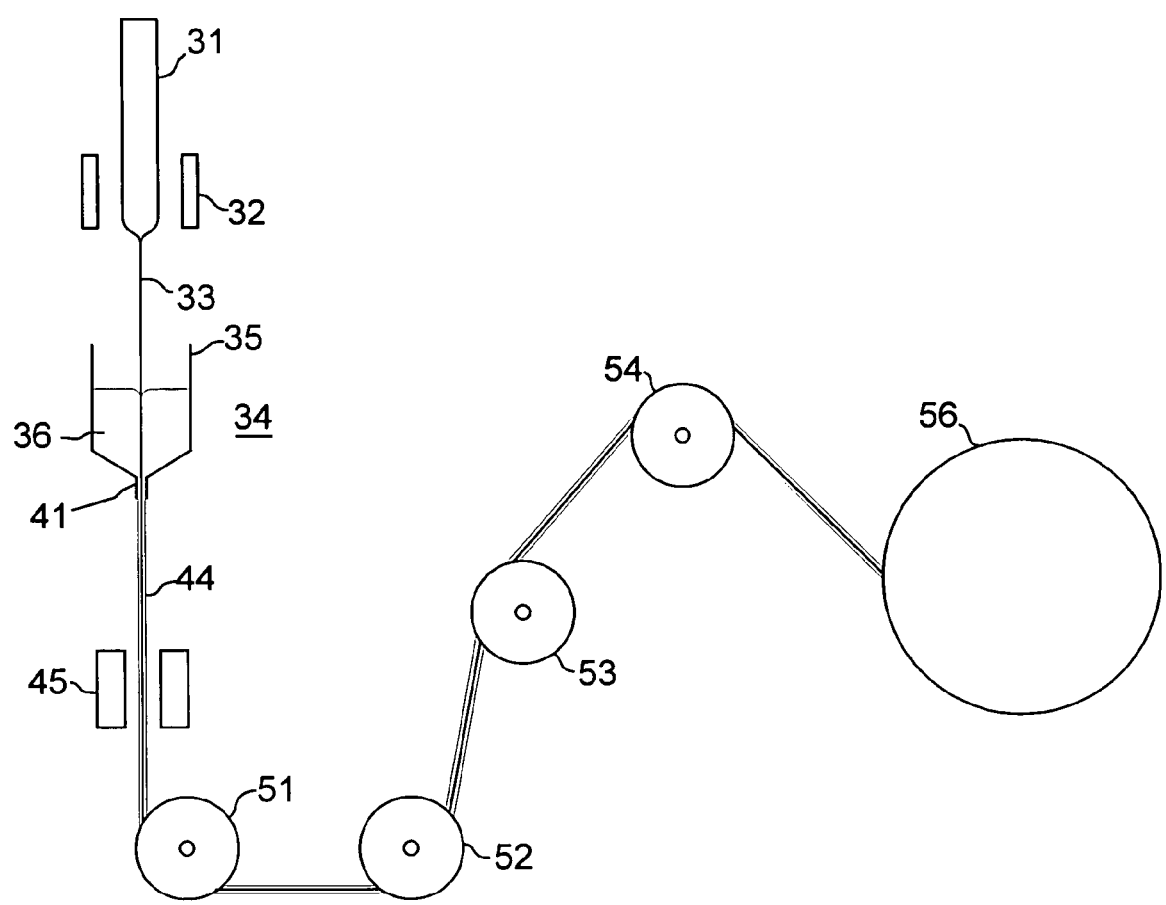
FIG. 4 is a schematic view of an optical fiber drawing apparatus suitable for use with the invention.

FIG. 4 shows an optical fiber drawing apparatus with preform 31, and susceptor 32 representing the furnace (not shown) used to soften the glass preform and initiate fiber draw. The drawn fiber is shown at 33. The nascent fiber surface is then passed through a coating cup, indicated generally at 34, which has chamber 35 containing a coating prepolymer 36. The liquid coated fiber from the coating chamber exits through die 41. The combination of die 41 and the fluid dynamics of the prepolymer, controls the coating thickness. It is important that the fiber be centered within the coating cup, and particularly within the exit die 41, to maintain concentricity of the fiber and coating. Hydrodynamic pressure in the exit die itself aids in centering the fiber in the die. The prepolymer coated fiber 44 is then exposed to UV lamps 45 to cure the prepolymer and complete the coating process. Other curing radiation may be used where appropriate. The fiber, with the coating cured, then passes an assembly of reels for aligning, pulling, and taking up the fiber for storage on spool 56. The drive means for pulling the fiber may be the take-up spool but is preferably capstan 54. Reels 51–53 are guide reels for aligning and handling the finished fiber. The draw force and rotational speed provided by capstan 54 determines the draw speed of the optical fiber. Draw speeds from 1–20 meters/sec. are typical. From capstan 54 the fiber is lead to an independently driven take-up spool 56. A stepper motor, controlled by a micro-step indexer (not shown), controls the take-up spool.

Those skilled in the art will recognize that FIG. 4 shows but one of many suitable arrangements.

Coating materials for optical fibers are typically urethanes, acrylates, or urethane-acrylates, with a UV photoinitiator added. The apparatus is FIG. 4 is shown with a single coating cup, but dual coating apparatus with dual coating cups are commonly used. In dual coated fibers, typical primary or inner coating materials are soft, low modulus materials such as silicone, hot melt wax, or any of a number of polymer materials having a relatively low modulus. The usual materials for the second or outer coating are high modulus polymers, typically urethanes or acrylics. In commercial practice both materials may be low and high modulus acrylates. The coating thickness typically ranges from 150–300 μm in diameter, with approximately 240 μm standard.

Figure 5:
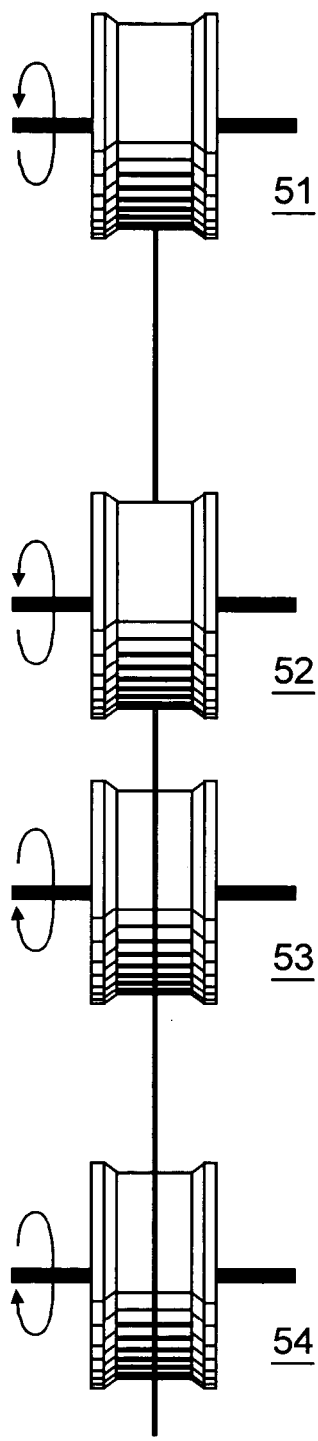
FIG. 5 shows, schematically and in top view, the guide portion of the apparatus of FIG. 4.

In a conventional draw apparatus the fiber essentially moves in a single plane at least between its point of origin in the furnace and the capstan, and no twist is intentionally impressed on the fiber. See FIG. 5, which is a schematic top view of the reels in FIG. 4.

According to the invention, a torque is applied to the fiber such that a spin is impressed on the fiber. Although in principle the torque could be applied at any downstream point (prior to take-up) at which the fiber has cooled sufficiently to be contacted, physical contact with bare fiber should be avoided. Thus, the torque advantageously is applied at a point downstream from the curing station, typically by means of the first guide roller.

Figure 6:
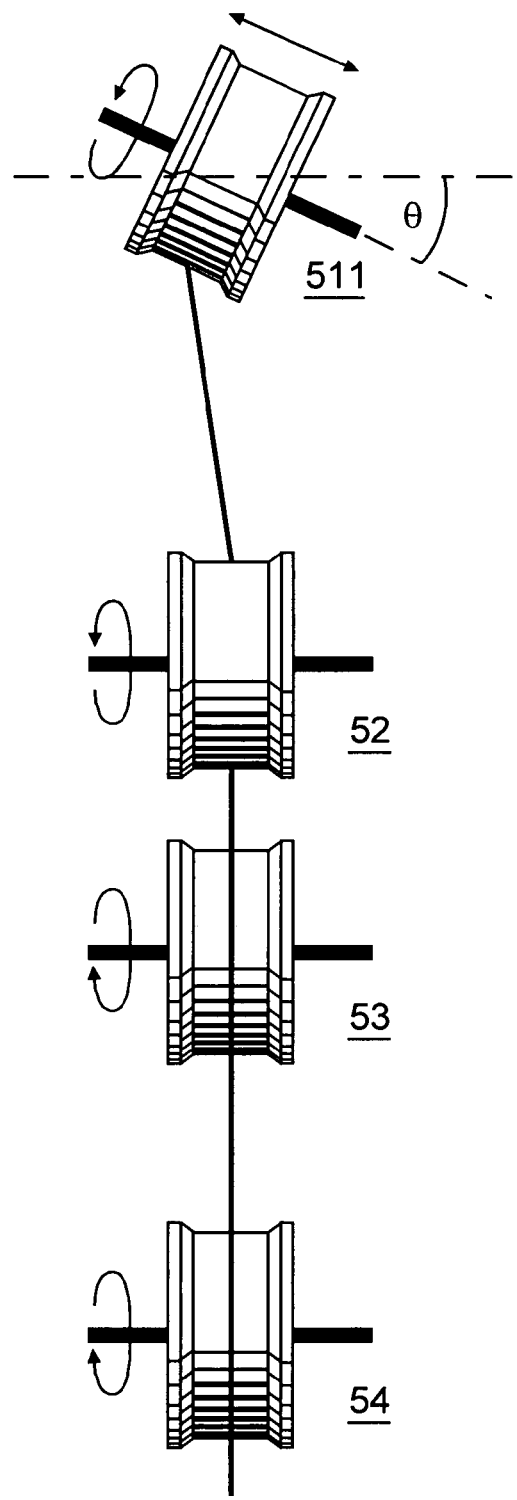
FIGS. 6–8 are representations, also schematically and in top view, of guide means that can be used to practice the invention.

We have discovered that an intermittent torque can be applied to the fiber, such that a twist with non-constant pitch is impressed on the fiber. In a preferred embodiment, this is accomplished by changing the orientation of guide roller 51 of FIG. 5, for example by canting the roller by an angle Θ around a direction parallel to the draw tower axis (see FIG. 6). Canting roller 511 as indicated causes the fiber to oscillate back and forth on the roller, in response to lateral forces that automatically arise in this arrangement. More specifically, the lateral forces translate into a torque on the fiber, which causes the fiber to roll laterally on roller 511, thereby moving the fiber out of the plane defined by the fiber in the (un-canted) apparatus of FIG. 5. It will be appreciated that the lateral roll is superimposed on the conventional draw motion. The lateral motion of the fiber is believed to give rise to a restoring force that increases with increasing lateral displacement of the fiber, causing the fiber to jump back (substantially, but not necessarily exactly) into the plane, only to immediately begin another sidewise roll. This non-symmetrical back-and-forth motion is indicated by the double-headed arrow adjacent to roller 511 in FIG. 6. The angular rotation speed of the fiber during the lateral roll is, inter alia, a function of the cant angle Θ. Thus, the pitch of the spin impressed on the fiber is also a function of Θ. For instance, one suitable draw apparatus yielded average pitches of 14 and 7 cm for Θ=7° and 15°, respectively. It will be appreciated that these values are by way of example only, since the pitch will depend, inter alia, on the configuration and height of the draw tower, the draw speed, the draw tension and the coating viscosity.

Those skilled in the art will recognize that in the example just described there is not only a spin impressed on the fiber but also a substantially equal and opposite (generally elastic) twist is introduced into the taken-up fiber. Although such fiber may be acceptable for some purposes (e.g., for sensor purposes that require only a relatively short length of fiber), it will often be desirable to avoid the unwanted elastic twist. The elastic twist can be removed by appropriate respooling. However, it is preferable to substantially prevent introduction of the elastic twist. This can be accomplished by alternately imposing a clockwise and a counterclockwise torque on the fiber as described below.

Figure 7:
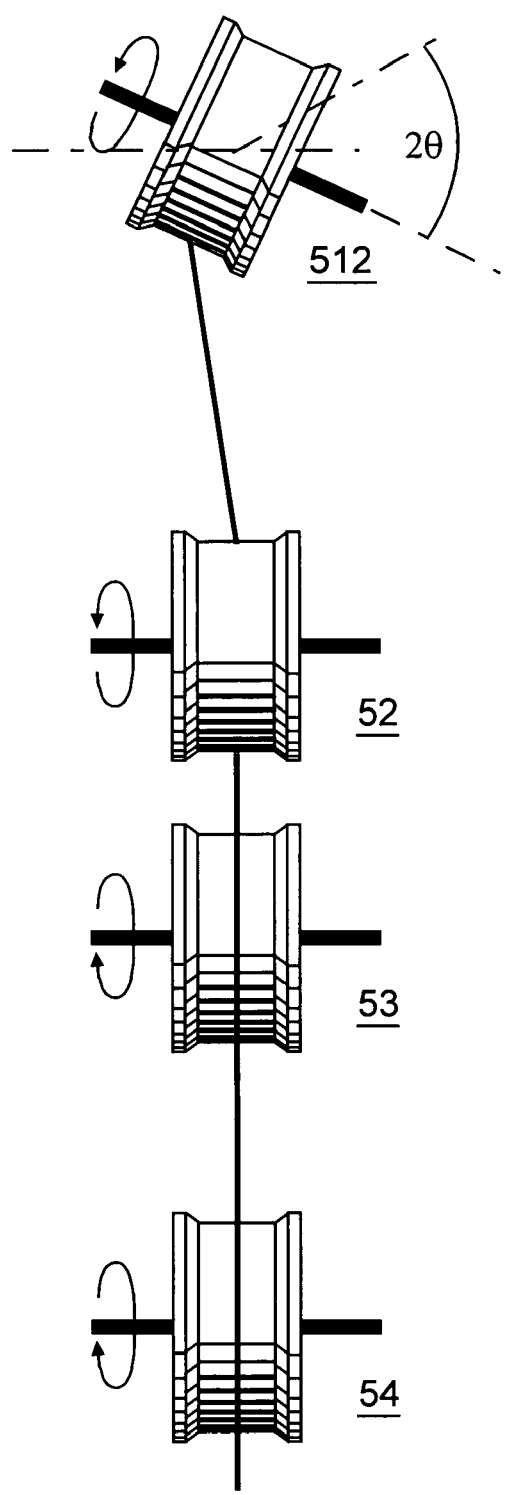
Figure 8:
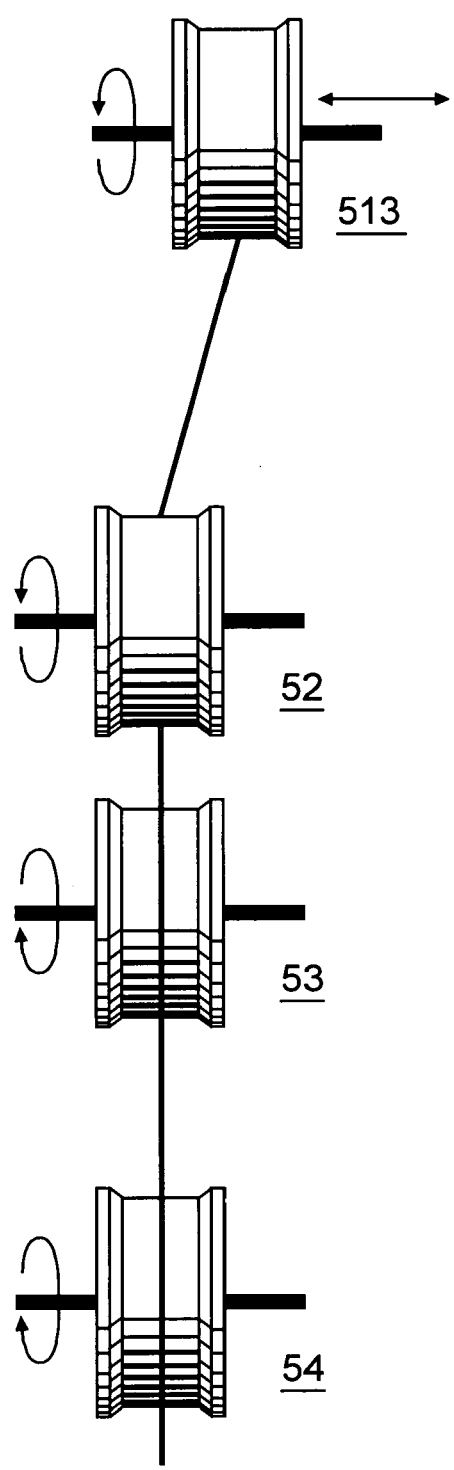

Causing the guide roller 512 of FIG. 7 to oscillate about an axis that is parallel to the fiber draw direction (which is typically the same as the draw tower axis) alternately impresses positive and negative spin on the fiber. Furthermore, the resulting positive and negative elastic twists on the fiber substantially cancel, such that the fiber on the take-up spool is substantially free of torsional elastic strain. Guide roller 512 of FIG. 7 can be caused to oscillate back and forth by any appropriate means, e.g., by eccentric drive means (not shown). An alternate arrangement is schematically shown in FIG. 8, wherein guide roller 513 is caused to move back and forth axially, by appropriate conventional means that are not shown, resulting in alternate application of clockwise and counterclockwise torque on the fiber.

Figure 9:
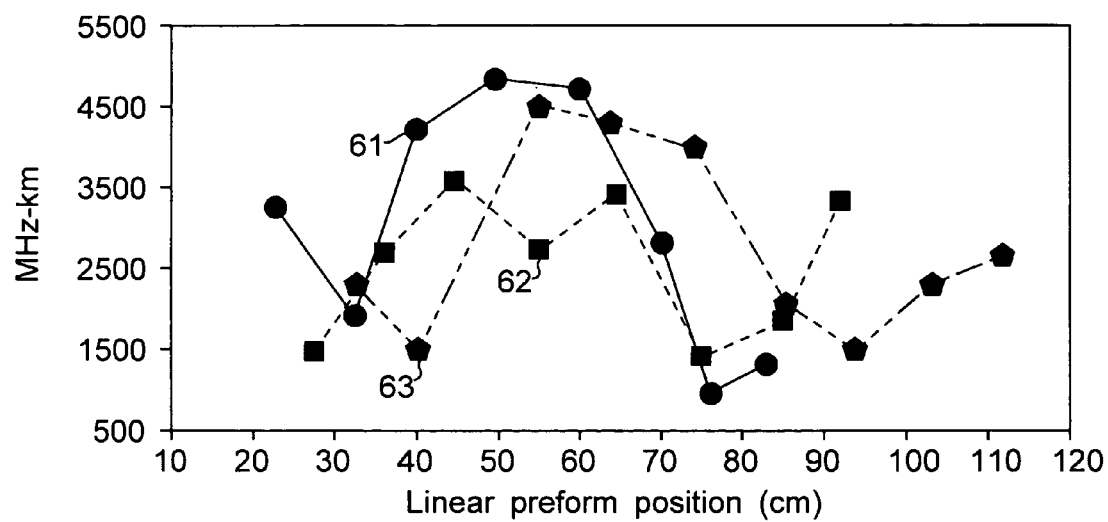
FIGS. 9 and 10 show measured data comparing bandwidth for optical fibers treated with spin according to the invention with untreated optical fibers.
Figure 10:
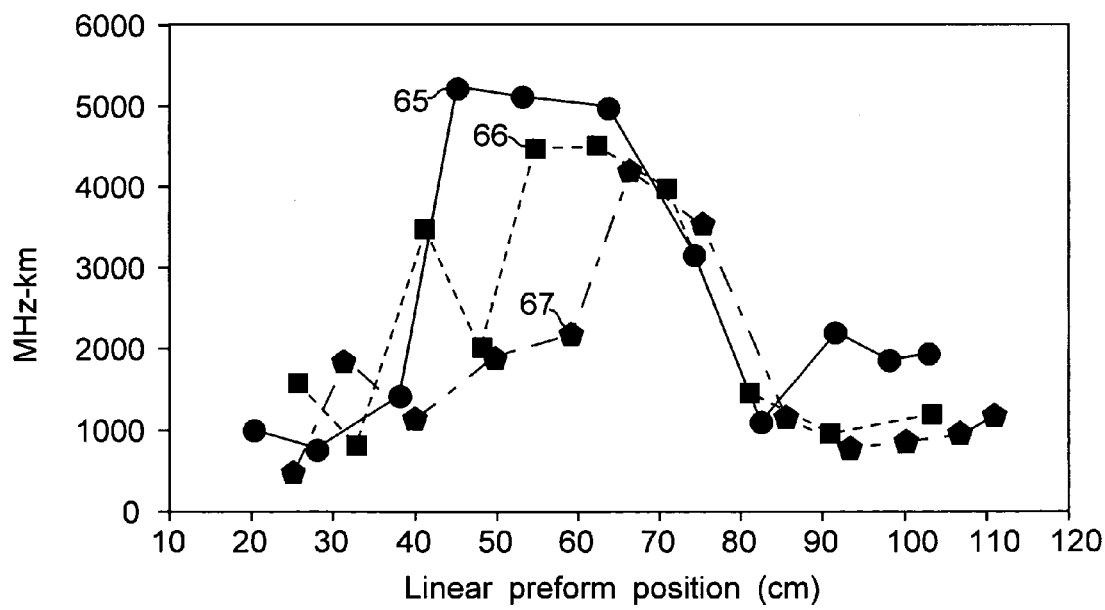

FIGS. 9 and 10 show experimental data comparing 850-nm fiber bandwidth for twisted circular core fiber vs. non-twisted circular core fiber. For the data shown in FIG. 9, the fibers were drawn using the same apparatus and draw process. For the data shown in FIG. 10, the fibers were also drawn using the same apparatus and draw process but the apparatus was different from that used to obtain the data of FIG. 9. This experiment shows, inter alia, that the qualitative results obtained are not dependent on the draw apparatus.

With reference to FIG. 9, the curve with circles 61 and the curve with pentagons 63 are for fibers twisted during draw according to the invention. The twist period for these fibers was 6.7 cm. The nominal core ovality was less than 5%. The curve for the squares 62 gives bandwidth data for essentially the same fiber that was not twisted during draw. Similarly, in FIG. 10, the curve with circles 65 shows data for a fiber that was twisted during draw according to the invention with a twist period of 6.7 cm. Curves 66 and 67 show data for similar fibers that was not twisted. The nominal core circularity in all cases was less than 5% ovality.

As will be understood from the above, the invention is directed to improving the transmission properties of optical fiber that is drawn from preforms of high quality, i.e. free of defects such as excessive core eccentricity or ovality. The observation that optical fiber drawn from these apparently relatively defect free preforms can be improved using twist is unexpected. The cores of these preforms typically have very low ovality, a prerequisite for categorizing the preform as high quality. Ovality of the core can be measured by taking two or more diameter measurements, at different places around the periphery of the core, and comparing them. Variations of less than 6%, and preferably less than 3%, are considered as indicating a circular core. The less evident perturbations, for example azimuthal variations, are believed to be responsible for the discovered effect, i.e. increased bandwidth in optical fibers drawn from preforms with high apparent uniformity and perfection.

As indicated above, the twist, or chiral structure, can be imparted to the optical fiber by twisting the preform during draw, or twisting the drawn fiber during draw. Each of these alternatives is meant to be defined by the phrase "twisting the drawn fiber during the draw operation" or the like.

Also as indicated earlier, the optical fibers that will typically be processed according to the invention are silica-based optical fibers. Silica-based generally means that at least 65% of the glass in the optical fiber is $SiO_2$.

The twist described above is relatively constant, i.e. the same twist motion is imparted to the entire length of fiber during the fiber draw. There are additional random mechanisms possible that may aid in substantially reducing DMD in multimode fibers. The twisting mechanism used to impart twist to the fiber has several characteristics. Two of note here are the spin frequency, i.e. the number of twists per meter, the spin velocity function, which is the rate of change of spin with time. Each of these can be randomized for additional improvement in DMD properties. The spin frequency may be varied randomly between, e.g., 1–10 twists per meter. An arbitrary interval may be selected, for example, 10 meters, and the twist for one ten meter segment may be 4, for another 7, and so on. A simple random number program may be used for the control. The spin velocity function may also be randomly varied. The spin velocity function is the axial pattern of the twisting or, equivalently the time-dependence of the angular velocity of the spinning. As shown earlier, the spin alternates in direction every meter or two, so the angular velocity of spinning crosses through zero periodically. A typical pattern approximates a sinusoid. However, the spin pattern may be varied to provide greater randomness. One such pattern approximates a trapezoid with a dwell at the highest angular velocity. Other non-sinusoidal spin patterns may be used. The spin pattern may also be varied during draw to effect additional randomness.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. An article comprising multimode optical fiber having:
   i an essentially circular core
   ii a radially varying refractive index, and
   iii a core diameter greater than 30 microns, with a twist impressed on the core, the twist being at least one per meter of optical fiber.

2. Article according to claim 1, wherein the twist alternates between clockwise twist and counterclockwise twist.

3. Article according to claim 2, wherein the twist is at least four per meter of optical fiber.

4. Article according to claim 2 wherein the core has an ovality of less than 6%.

* * * * *